Patented Sept. 16, 1941

2,255,998

UNITED STATES PATENT OFFICE 2,255,998

MANUFACTURE OF HARDENED ARTICLES

Arthur M. Howald and Leonard S. Meyer, Toledo, Ohio, assignors to Plaskon Company, Incorporated, Toledo, Ohio, a corporation of Delaware No Drawing. Application August 9, 1938, Serial No. 223,908

1 Claim. (Cl. 260—39)

The invention relates to the manufacture of hardened articles from compositions containing water and a water-soluble hardenable resin-former. Certain hardenable resin-formers, such as formaldehyde-urea and formaldehyde-phenol reaction products, are available as water solutions, and they can be handled very conveniently and inexpensively in the form of water solutions.

In dry form the resin-formers are not plastic except at high temperatures, so that hot-pressing equipment is generally required for the production of shaped articles therefrom. However, equipment for molding resin-formers under high pressure and temperature is very cumbersome and expensive, and an inexpensive method of producing shaped articles from resin-formers without the use of high temperature or pressure would be highly advantageous.

Although the dry resin-formers are plastic only at an elevated temperature, their concentrated aqueous solutions are pourable, or at least plastic, so that they can be cast in molds. After an article has been cast from an aqueous solution of a resin-former, however, the article cracks and disintegrates in drying out. It is believed that the disintegration of articles cast from such solutions is due to the peculiar properties of the solutions. These aqueous solutions are thought to be colloidal in character, and evaporation of the water therefrom leaves a solid that is peculiarly lacking in structural strength and continuity.

The principal object of the invention is the preparation of hardened articles from water-soluble resin-formers with water as a plasticizer. More specific objects and advantages are apparent from the description, which merely discloses and illustrates the invention and is not intended to impose limitations upon the claim.

A hardened article embodying the invention is made from a composition comprising water, a water-soluble hardenable resin-former and a sufficient quantity of a hydraulic cement to prevent material cracking of the composition upon hardening. The composition may also contain a fibrous filler, such as wood flour or other cellulosic material, and an agent for hardening the resin-former, such as an alkali or an acid.

The hydraulic cement should not be of such acidity or alkalinity as to interfere with the hardening of the resin-former. For example, water-soluble formaldehyde-urea reaction products harden only in the presence of an acid, so that an acid or substantially neutral hydraulic cement should be used with such products. An alkaline hydraulic cement, such as Portland cement, may be employed with formaldehyde-phenol reaction products that harden in alkaline media.

The quantity of hydraulic cement should be sufficient to prevent material cracking upon hardening of the composition, and should also be sufficient to take up substantially all the water in the composition, so that no evaporation of water is necessary.

Within these limits, the quantity of water to be used in a given composition is determined simply by the stiffness desired. Any proportion of fibrous filler that does not render the composition too stiff may be employed, but the use of larger proportions of water makes it possible to employ larger proportions of fibrous filler.

A dry mixture of the resin-former with the hydraulic cement is convenient to ship, and a purchaser thereof can make up his hardenable composition by simply adding the proportion of water indicated above. For example, a powdered, hardenable resin-former may be mixed with a powdered cement, with or without a powdered fibrous filler, and the dry hardening agent may either be mixed with the other ingredients or enclosed in a separate package for shipment.

A hardenable composition embodying the invention can be made stiff enough for use as a putty by regulation of the proportion of water. The stiff, hardenable composition does not resemble plaster, but has a consistency similar to that of ordinary putty, so that it can be used for puttying window panes. However, the hardened composition is superior to hardened putty, in that it is much more durable and weather-resistant.

Articles embodying the invention are much harder, tougher and stronger than articles made of plaster, and their surface does not disintegrate when scratched, like the surface of a plaster article. Moreover, the present composition when hardened is superior to plaster, in that it can be polished.

A suitable solution of a formaldehyde-urea reaction product may be prepared as follows: Urea and formaldehyde in a molar ratio of 1 : 2 are gently refluxed in an aqueous solution that has been brought to pH 4.5–5.0 by means of sodium hydroxide. After the refluxing has been continued long enough (about 1 hour) to carry the formaldehyde-urea reaction to the desired stage, the solution is neutralized and evaporated under a vacuum to the desired concentration. To facilitate shipment, the formaldehyde-urea compound may be obtained in granular or powdered form by drum-drying or spray-drying the solution so prepared.

Hardening agents that are suitable for use with formaldehyde-urea reaction products are acid substances, such as ammonium chloride. The quantity of hardening agent that is employed is an amount sufficient to harden the resin-former at the desired speed.

Example 1

A hardening agent is dissolved in 180 parts of a 60 per cent solution of a formaldehyde-urea reaction product prepared as described above. The solution is then mixed with 400 parts of plaster of Paris to produce a soft putty. By addition of 40 parts of wood flour, the mass is made stiff enough so that it is just sufficiently pliable to be worked by hand. The composition so produced can be used in place of ordinary putty. It contains sufficient plaster of Paris to take up substantially all the water in the composition.

Example 2

450 parts of plaster of Paris, 90 parts of a powdered formaldehyde-urea reaction product obtained by spray-drying a solution prepared as described above, and a suitable quantity of a hardener are intimately mixed in the dry state. The addition of 60 parts of water to the dry resulting mixture produces a composition in which the proportion of plaster of Paris is just sufficient to take up all the water. It has been found that compositions which do not contain an excess of water over the amount taken up by the hydraulic cement are preferably formed under pressure to produce properly bonded articles. However, no heat is necessary, and the pressure may be considerably lower than that employed for the hot-molding of thermosetting compositions. The cold-molding composition of the present example affords excellent mold reproduction, because it expands slightly upon hardening in the mold. The resulting article is very hard, and does not chip or scratch readily like an article made from plaster.

Various applications of the invention may be devised to meet various requirements.

Having described our invention, we claim:

A method of making hardened articles that comprises preparing a self-hardening, pliable composition comprising a water solution of a water-soluble formaldehyde-urea reaction product, a hardening agent therefor, and a sufficient quantity of plaster of Paris to prevent material cracking upon hardening of the composition, said composition containing from about 3 to about 4 parts of said formaldehyde-urea reaction product, and from about 2 to about 2.7 parts of water for every 15 parts of plaster of Paris, and molding said composition under pressure.

ARTHUR M. HOWALD.
LEONARD S. MEYER.